US012643277B2

(12) United States Patent
Perk et al.

(10) Patent No.: US 12,643,277 B2
(45) Date of Patent: Jun. 2, 2026

(54) METHOD FOR MANUFACTURING A CUSHION AND CUSHION

(71) Applicant: OTTO BOCK MOBILITY SOLUTIONS GMBH, Königsee-Rottenbach (DE)

(72) Inventors: Heinrich Perk, Königsee-Rottenbach (DE); Arne Hothan, Königsee-Rottenbach (DE); Johann-Christoph Müller, Königsee-Rottenbach (DE); Stefan Castrup, Königsee-Rottenbach (DE)

(73) Assignee: OTTO BOCK MOBILITY SOLUTIONS GMBH, Königsee-Rottenbach (DE)

( * ) Notice: Subject to any disclaimer, the term of this patent is extended or adjusted under 35 U.S.C. 154(b) by 283 days.

(21) Appl. No.: 18/255,678

(22) PCT Filed: Dec. 1, 2021

(86) PCT No.: PCT/EP2021/083827
§ 371 (c)(1),
(2) Date: Jun. 2, 2023

(87) PCT Pub. No.: WO2022/122512
PCT Pub. Date: Jun. 16, 2022

(65) Prior Publication Data
US 2025/0073980 A1 Mar. 6, 2025

(30) Foreign Application Priority Data
Dec. 7, 2020 (DE) ..................... 10 2020 132 404.9

(51) Int. Cl.
*B29C 51/00* (2006.01)
*A47C 27/08* (2006.01)
(Continued)

(52) U.S. Cl.
CPC ............ *B29C 51/10* (2013.01); *A47C 27/085* (2013.01); *B29C 51/14* (2013.01); *B29C 51/265* (2013.01);
(Continued)

(58) Field of Classification Search
CPC ....... B29C 51/10; B29C 51/105; B29C 51/14; B29C 2966/438; B29C 2966/814
See application file for complete search history.

(56) References Cited

U.S. PATENT DOCUMENTS 6,279,300 B1 * 8/2001 Simhaee ................... B32B 3/30
53/567
7,157,034 B2 * 1/2007 Bristow .............. B60R 13/0225
264/510
(Continued)

*Primary Examiner* — Thu Khanh T. Nguyen
(74) *Attorney, Agent, or Firm* — WCF IP

(57) ABSTRACT

The invention relates to a method for producing a cushion for an orthopedic device, the cushion having a first component, which comprises a first film layer and a second film layer, and a second component that are joined with each other in such a way that there is at least one fluid-filled volume between the first component and the second component, the method comprising the following steps: inserting the first film layer, which has at least one opening, and the second film layer into a tool, which has an upper mold and a lower mold; applying a differential pressure to at least one of the film layers, so that the at least one film layer moves at least in sections towards the upper mold or the lower mold, thereby creating a distance between the two films; joining the two film layers along at least one connection line.

9 Claims, 3 Drawing Sheets

Fig. 10

Figures 1, 2, 3, 4:
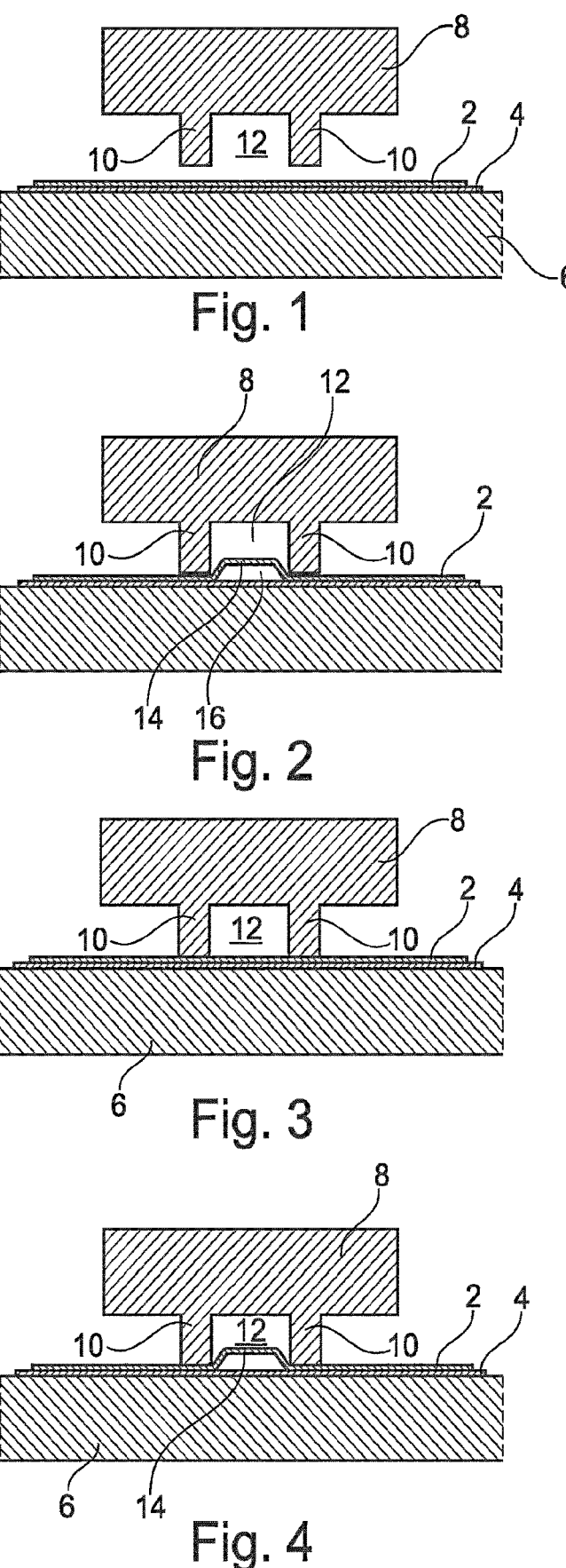

(51) Int. Cl.

| | | |
|---|---|---|
| *B29C 51/10* | (2006.01) | |
| *B29C 51/14* | (2006.01) | |
| *B29C 51/26* | (2006.01) | |
| *A47C 27/10* | (2006.01) | |
| *B29L 31/00* | (2006.01) | |
| *B29L 31/58* | (2006.01) | |

(52) U.S. Cl.
CPC ........... *A47C 27/10* (2013.01); *B29L 2031/58* (2013.01); *B29L 2031/751* (2013.01); *B29L 2031/753* (2013.01)

(56) References Cited

U.S. PATENT DOCUMENTS

| | | | | |
|---|---|---|---|---|
| RE40,288 E | * | 5/2008 | Perkins | B29C 66/344 156/583.1 |
| 2011/0024055 A1 | * | 2/2011 | Chiang | B29C 65/222 156/497 |
| 2012/0084999 A1 | * | 4/2012 | Davis | B29C 37/0067 156/289 |
| 2013/0032293 A1 | * | 2/2013 | Birkle | B29C 66/439 156/538 |
| 2014/0328551 A1 | * | 11/2014 | Nevo | B65D 81/052 383/3 |
| 2017/0215618 A1 | * | 8/2017 | Park | B29C 43/36 |
| 2017/0349304 A1 | * | 12/2017 | Borgeat | B29C 66/4312 |
| 2019/0297997 A1 | * | 10/2019 | Campos, II | A43B 13/14 |

* cited by examiner

A - A

B - B

METHOD FOR MANUFACTURING A CUSHION AND CUSHION

The invention relates to a method for producing a cushion for an orthopedic device. The invention also relates to a method for producing such a cushion for an orthopedic device. Such a cushion comprises a first component and a second component that are joined with each other in such a way that there is at least one fluid-filled volume between the first component and the second component.

Different orthopedic devices have at least one or multiple cushions, for example for protecting and cushioning body parts supported in the orthopedic device. This refers, for example, to seat cushions, backrests, headrests, lateral support brackets, arm rests or other cushions for, for example, wheelchairs, mattresses and cushions for orthopedic beds and hospital beds as well as cushions as they are arranged in orthoses, for example, for providing protective support for a body part in the orthosis. A cushion is preferably understood to mean a fluid-filled element that is used to support and/or position at least one body part.

A range of these cushions are known from the prior art. They have a fluid-filled volume which, for example, may be an air cushion. Fluids are, for example, gases, gels, especially viscoelastic gels, or liquids. The volume that is filled with the fluid is formed by the two components, which are preferably made of a flexible material. The material is also preferably, but not necessarily, designed to be elastic. Conventionally, one of the two components is a 3-dimensional component that is designed, for example, in the form of a cup or a dome and forms a cavity that is open on at least one side. The second component, which is preferably also made of a flexible and, where applicable, elastic material, is then joined with the first component, thereby closing the volume.

Cushions are known that comprise multiple fluid-filled volumes, in particular multiple cups or domes, and are made of more than two components. Such cushions are included in the description given here. In the context of the present invention, the cushion has at least a first component and at least a second component, between which there is at least one fluid-filled volume. This includes cushions that comprise precisely one first component and/or precisely one second component as well as cushions that comprise more than one first component and/or more than one second component.

DE 10 2019 105 425 A1, which has not been previously published, discloses a method in which the first component is produced by compression molding in the form of a 3-dimensional cushion part by filling the material in a mold, which comprises an inner mold and an outer mold, and, for example, melting it. A second component is glued, welded or vulcanized onto the component produced in this manner, thereby closing the volume between the two components. In a certain embodiment, the cushion has multiple volumes or chambers, which are connected to each other via fluid connections. The production of these fluid connections is complex and usually requires connection elements, such as tubes or ducts, to be inserted into and joined with the material of the components of the cushion. This is complex as the additional elements must be inserted into the mold, in which the respective component is molded, at the right point. This requires additional process steps, which increases production time and therefore also production costs. In addition, the various components must be stocked and added to the production process separately.

The invention thus aims to further develop a method for producing a cushion in such a way that it can be performed easily, quickly and flexibly.

The invention solves the addressed task by way of a method for producing a cushion for an orthopedic device, the cushion having a first component, which comprises a first film layer and a second film layer, and a second component that are joined with each other in such a way that there is at least one fluid-filled volume between the first component and the second component, the method comprising the following steps:

inserting the first film layer, which has at least one opening, and the second film layer into a tool, which has an upper mold and a lower mold, applying a differential pressure to at least one of the film layers, so that the at least one film layer moves at least in sections towards the upper mold or the lower mold, thereby creating a distance between the two foil layers, joining the two film layers along at least one connection line.

According to the invention, at least two film layers are used to produce the first component, at least one of which has at least one opening. If any additional fluid is to be introduced into the fluid-filled volume of the cushion or excess fluid removed from the fluid-filled volume, this should, in the case of a finished cushion, occur between the two film layers. Through the at least one opening provided in the first film layer, the fluid is directed into a space between the two film layers, or the fluid exits the space into the fluid-filled volume of the cushion. To this end, it is advantageous if the two film layers do not lie against each other over their entire surface, but instead a distance has initially formed in sections between the two film layers.

The film layers are preferably part of a single film which is, for example, folded on itself. Two or more sections of the film can then be laid on top of each other and fixed to each other. Alternatively, the two film layers are parts of different films. This is particularly advantageous when different film layers are to be used which differ, for example, in the material of the film layers, their thickness or other properties.

The two film layers are inserted into a tool that has an upper mold and a lower mold. Preferably, the upper mold and the lower mold are designed in such a way that they clamp the two film layers along areas or lines when the upper mold and the lower mold are moved towards each other. Preferably, at least part of these lines is identical to the at least one connection line along which the two film layers are to be joined with each other. Before or while this is happening, however, a differential pressure is applied to at least one of the film layers. This means that on one side of the film layer, a different pressure, especially an air pressure, prevails than on the opposite side. This can be achieved in various ways.

In a first embodiment, a space between a film layer and the upper mold or the lower mold is subjected to a negative pressure. This negative pressure ensures that the respective film layer moves towards the upper mold or the lower mold, at least in sections. As a result, the one film layer separates from the other film layer, thus creating the space and distance between the two film layers. Alternatively or additionally, a negative pressure can also be applied between the two film layers. This can be achieved, for example, by introducing air or another fluid between the two film layers.

This causes at least one of the two film layers to move towards the upper mold or the lower mold and the two film layers to separate from each other. Alternatively or additionally, the spaces between both the upper mold and the one film layer and the lower mold and the other film layer can also be subjected to a negative pressure that is strong enough to move the respective film towards the mold.

The possible or maximum permissible strength of the respective negative pressure and/or excess pressure depends on a range of factors, such as the distance between two adjacent connection lines, the forces of adhesion between the two film layers, their thickness, stiffness and material. The upper mold and/or the lower mold can also be made up of multiple elements.

In this state, in which there is a distance between the two film layers, at least in sections, the two film layers are joined with each other along the at least one connection line. Preferably, at least one connection line is designed in such a way that the distance between the two joined film layers remains intact or at least does not completely disappear when the two joined film layers are removed again from the tool. The connection lines are not limited to straight lines, but instead can take any shape that is practical and advantageous for the respective application and purpose.

A first component designed in this way that comprises the two thus joined film layers is joined with the second component in such a way that it creates the fluid-filled volume. In the simplest case, the fluid-filled volume comprises a single chamber that is filled with a fluid, for example a gas, a gel or a liquid.

When the differential pressure is applied, the film layers are preferably deformed and joined with each other along the at least one connection line in such a way that they do not lie against each other over their entire surface in the area of the at least opening of the first film layer. This means, in particular, that they cannot be completely sealed by an excess pressure prevailing inside the fluid-filled volume. This ensures that fluid from the respective volume can enter the space between the two film layers.

Preferably, at least one connection line is designed in the form of a ring that is interrupted at at least one point, preferably at least two points, especially preferably at least three points. This is a particularly suitable form of the connection line for maintaining the distance between the two film layers, especially in the area enclosed by the interrupted ring. Regardless of the direction in which a tensile force is applied to the two film layers, said force running in particular parallel to the film layers, it is not possible to bring the two film layers within the interrupted ring completely into contact with each other without deforming the film layer, or damaging or destroying the connection along the at least one connection line. In the context of the present invention, a ring is understood to mean a closed contour. An interrupted ring is an interrupted closed contour. Neither a ring nor an interrupted ring has to be circular in shape, if this is a preferred embodiment. Even an oval embodiment, or a polygon or free form, can be used as a ring and, if there is at least one interruption, as an interrupted ring.

In an alternative embodiment, the cushion has multiple connection lines and/or at least sections of at least one connection line that are arranged in such a way that they are arranged on different sides of the opening of the first film layer. In a preferred embodiment, the opening is located at least partially, but preferably completely, between two or more connection lines. For example, these may run towards the opening, wherein two such connection lines are sufficient, but three or four are advantageous. Particularly preferably, they extend towards the opening at as equal an angle as possible. In the case of three connection lines, this angle is preferably 120°; with four connection lines it is 90°.

Particularly preferably, at least one opening of the first film layer lies at least partially within the interrupted ring. It is therefore possible, due to pressure on the fluid-filled volume of the cushion, to introduce the fluid, for example air, through the opening of the first film layer into the space that emerges due to the distance between the two film layers. The risk of the two film layers lying so closely against each other that an increase in pressure inside the fluid-filled volume prevents an introduction of the fluid between the two film layers is thus reduced and, in the best case scenario, ruled out.

Preferably, at least one opening of the first film layer lies completely within the interrupted ring, which is formed by the at least one connection line. The greater the proportion of the opening that lies within the interrupted ring, the more air can be introduced through this part of the opening into the space between the film layers when pressure is applied to the fluid-filled volume. The part of the opening that does not lie within the interrupted ring is, where applicable, sealed by the underlying second film layer and cannot be used for a transfer of the fluid into the volume or out of the volume.

Advantageously, a connection, especially a channel between the two film layers, is formed by at least two connection lines through which fluid from outside of the cushion can reach the inside of the fluid-filled volume and/or through which fluid can leave the fluid-filled volume and squeeze out of the cushion. The two connection lines that delimit the connection at the sides, in particular that form the channel and along which the two film layers are connected to each other, preferably, but not necessarily, extend parallel to each other. In a preferred embodiment, the distance from the one connection line, which delimits the channel on the one side, to the other connection line, which delimits the channel on the other side, is longer along the one film layer than along the other film layer. As a result, the channel has an asymmetrical cross-section and does not completely collapse, even under the pressure of the fluid in the fluid-filled volume, so that a space and a distance between the two film layers inside the channel remains intact. Advantageously, this channel extends from the fluid-filled volume to the outer area of the cushion, where it has an opening to the surrounding air. Said channel is preferably connected to the fluid-filled volume by an opening of the first film layer which, in a particularly preferred embodiment, lies at least partially within an interrupted ring formed by one of the connection lines. A connection, especially a channel, that is delimited by at least two connection lines, can be connected to other connections, especially channels. In particular, it may be beneficial to configure at least one chamber between the film layers into which multiple channels or connections discharge. If the channels or connections that discharge into such a chamber lead to different fluid-filled volumes, it is particularly easy to spread the fluid across these volumes. The at least one chamber is preferably also delimited by connection lines between the film layers.

Preferably, the at least one channel is connected to a valve that can be opened and closed. It is thus possible to control whether the respective channel can be used for a transfer of fluid. If the valve is closed, no fluid can pass through the channel.

The film layers preferably lie against each other over their entire surface along at least one section of the channel. Such a section is, for example, at least 0.5 cm long, preferably at least 1 cm, especially preferably at least 1.5 cm. For the purposes of the present invention, the film layers lie against each other over their entire surface when they can be completely closed by a pressure exerted on them, for example by a stamp, so that no fluid can then pass through this section. This pressure is therefore referred to hereinafter as stamp pressure, even though it is preferably but not necessarily generated by a stamp. It is advantageous, but not necessary, if the film layers in the section lie against each other over their entire surface, even without this stamp pressure. Preferably, the cushion comprises at least one pressure element by means of which a stamp pressure can be applied to the section of the channel, said pressure being great enough to close the section and prevent the fluid from passing through this section. Such a pressure element, especially a stamp, can be arranged on the joined film layers, for example, after the film layers have been joined.

In preferred embodiments, there are at least two fluid-filled volumes between the first component and the second component of the cushion. These may be designed as chambers. Via a channel that extends between the two film layers and is formed by at least two connection lines of the film layers, fluid located in one of the two volumes can move from one of the two volumes into the other of the at least two volumes. To this end, it is advantageous if there is an opening of the channel in each of the two volumes, said opening preferably being formed by an opening of the first film layer. It preferably lies at least partially, but preferably completely, within an interrupted ring formed by one of the connection lines. The connection line that forms the respective interrupted ring can be the same one that delimits the channel on one side. However, it is also possible to create a separate connection line between the two film layers that form the interrupted ring, in which the opening of the first film at least partially lies. In general, it is advantageous if an opening of the first film layer is arranged completely within the interrupted ring. It is advantageous if, in addition to the channel that connects the at least two fluid-filled volumes to each other, further channels are formed between the film layers by joining the film layers to each other along further connection lines. These additional channels are preferably arranged in such a way that they each connect one or multiple fluid-filled volumes with the surrounding area of the cushion, so that fluid can be introduced from outside into the respective volume or removed from it. Embodiments with an interrupted ring are also possible. In such cases, it is preferably ensured that the connection lines are designed in such a way that the film layers do not lie against each other over their entire surface in the area of the opening of the first film layer, so that fluid can pass through the opening into the channel.

The two film layers are preferably joined by gluing or welding them together, wherein at least one of the film layers is preferably heated along the at least one connection line. This can be achieved, for example, by irradiating radiation, for example electromagnetic radiation, especially IR radiation or UV radiation, or ultrasound. In a preferred embodiment, the film layers are joined to each other by means of HF welding. To this end, a high-frequency (HF) electrical field is applied between the upper mold and the lower mold, for example. The frequency is preferably at least 10 MHz, preferably at least 20 MHZ, especially preferably at least 27 MHz. The parts of the mold, especially the upper mold and/or the lower mold, can also be heated, so that in the area in which the upper mold and the lower mold clamp the two film layers, sufficient heat is transferred into the material of the film layers to melt or at least soften this material. During subsequent solidifying or curing, the material of the two film layers bonds, thereby creating the connection lines.

The invention also solves the addressed task by way of a cushion for an orthopedic device with a first component, which comprises a first film layer and a second film layer, and a second component that are joined with each other in such a way that there is at least one fluid-filled volume between the first component and the second component, the cushion being characterized in that the film layers are joined with each other in such a way that fluid is directed out of the at least one fluid-filled volume between the film layers by applying pressure to the volume. It should be noted that this is preferably only possible due to the type of connection of the two film layers. Additional components, spacers, valves, tubes or ducts need not be used.

Preferably, the cushion comprises at least two fluid-filled volumes and the film layers are joined with each other in such a way that fluid between the film layers can be directed out of a first of the at least two volumes into a second of the at least two volumes by applying pressure to the first volume. The film layers are preferably joined with each other in such a way that there is at least one feed channel between the film layers, through which fluid from outside of the cushion can get into or out of the at least one fluid-filled volume. Preferably, the cushion has at least one valve by which the at least one feed channel can be opened or closed. The valve is preferably designed in the form of a section of a channel, which is formed between the film layers by at least two connection lines. In said section, the film layers lie against each other over their entire surface. The valve preferably also comprises at least one pressure element, by which pressure is applied to the section of the channel and the throughflow through this area of the channel can be prevented. In a preferred embodiment, the cushion is produced according to one of the methods described here.

In the following, an embodiment example of the invention will be explained in more detail with the aid of the accompanying drawings. They show FIGS. 1 to 9—different stages in the production of a cushion according to various embodiments of the present invention, and FIG. 10—a schematic top view of part of two joined films with accompanying sectional representations.

FIG. 1 shows a first film layer 2 and a second film layer 4, which have been jointly inserted into a mold comprising an upper mold 6 and a lower mold 8. The upper mold 8 has two downward projections 10, between which there is a space 12. In this step in the method, the two film layers 2, 4 are arranged between the two components of the mold. No differential pressure is applied.

FIG. 2 depicts a next step in the method. In the embodiment example shown, the space 12 between the two projections 10 is subjected to a negative pressure from a device that is not depicted. As a result, a part 14 of the first film layer 2 moves towards the upper mold 8, so that in this area a distance 16 emerges between the first film layer 2 and the second film layer 4. It should be noted that, in the example embodiment shown, the projections 10 are not resting against the first film 2. However, the part 14 of the first film 2 can still be moved by the negative pressure applied in the space 12. To this end, a pressure above this part 14 must be smaller than in the distance 16, i.e. between the two film layers 2, 4. A differential pressure is thus applied to the first film layer 2.

FIG. 3 depicts another embodiment. In this example, the upper mold 8 is first moved towards the lower mold 6 until the projections 10 rest on the first film layer 2.

In this embodiment example, the first film layer 2 and the second film layer 4 are clamped between the projections 10 of the upper mold 8 and the lower mold 6. In this example in FIG. 3, there has been no change in the pressure inside the space 12.

This changes in FIG. 4. The projections 10 of the upper mold 6, together with the lower mold 8, still clamp the first film layer 2 and the second film layer 4, but the air pressure is now reduced in the space 12, so that the part 14 of the first film layer 2 moves as in FIG. 2.

Figures 5, 6, 7, 8:
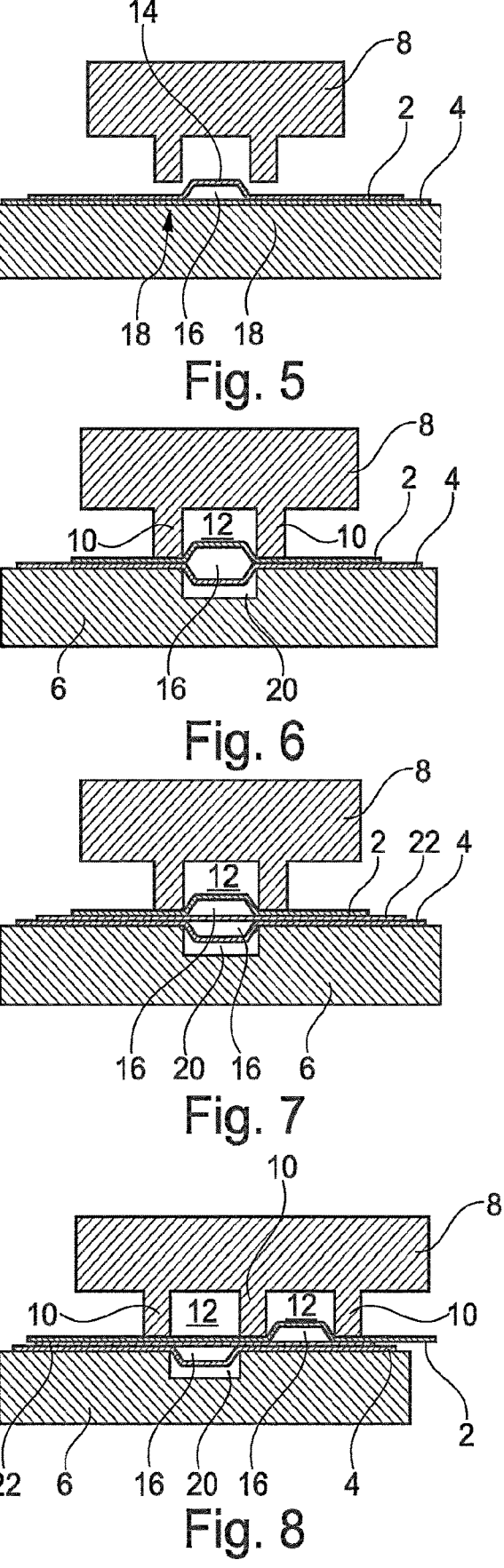

The two film layers 2, 4 are subsequently joined with each other along connection lines 18. This is shown in FIG. 5. The dividing line between the first film layer 2 and the second film layer 4 is interrupted in the areas of the connection lines 18. The figure shows that the two film layers 2, 4 are joined with each other as a result. In the sectional view shown, the connection lines 18 are of course not recognizable as a line, as they extend beyond the drawing plane. Once the connection lines 18 have been created and the first film layer 2 joined with the second film layer 4, the upper mold 8 can be removed upwards. The part 14 of the first film layer 2 remains at a distance 16 from the second film layer 4, thereby creating a cavity. If the first film layer 2 and the second film layer 4 are joined in a section without it leading to a movement or deformation of at least of the film layers 2, 4, a section forms between two connection lines 18 created in this manner that can be used as part of a valve, the film layers 2, 4 lying against each other across their entire surface in said section. However, it is not absolutely necessary to completely prevent a movement. A movement of the one film layer 2, 4 relative to the other film layer 4, 2 in a range of less than 0.5 mm, preferably less than 0.05 mm, produces a result that is sufficient for most applications.

FIG. 6 shows a further embodiment. The upper mold 8 again has two downward projections 10, between which space 12 is located. However, in the embodiment example shown, the lower mold 6 comprises an indentation 20. Both the indentation 20 and the space 12 can be subjected to a negative pressure, a device, not depicted, being provided for this purpose. This causes the first film layer 2 to move in the area of the space 12 towards the upper mold 8, and the second film layer 4 to move in the area of the indentation 20 towards the lower mold 6. As a result, the distance 16 increases and the space between the two film layers 2, 4 becomes larger.

FIG. 7 depicts an embodiment in which three film layers are arranged between the upper mold 8 and the lower mold 6 from FIG. 6. An intermediate film layer 22 is located between the first film layer 2 and the second film layer 4. Once again, the space 12 and the indentation 20 are subjected to a negative pressure, so that the first film layer 2 and the second film layer 4 move as depicted in FIG. 6. However, the intermediate film 22 arranged in the middle does not move, so that two distances 16 emerge. The first distance 16 is between the first film layer 2 and the intermediate film layer 22. The second distance 16 is between the second film layer 4 and the intermediate film layer 22.

FIG. 8 shows a further embodiment in which the upper mold 8 comprises three projections 10. Between these are two spaces 12, which can be separately subjected to a negative pressure. As in FIGS. 6 and 7, the lower mold 6 comprises an indentation 20, which can likewise be subjected to a negative pressure. In the situation in FIG. 8, the intermediate film layer 22 is again located between the first film layer 2 and the second film layer 4, the intermediate film layer remaining stationary. Unlike in FIG. 7, a negative pressure is not applied to the space 12 in the upper mold, which lies opposite the indentation 20. Instead, a negative pressure is applied to the space 12 depicted on the right in FIG. 8. The two distances 16 are therefore at an offset relative to each other and can, for example, belong to different channels between the two film layers 2, 4. Even if in the embodiment example shown there is an intermediate film layer 22 between the first film layer 2 and the second film layer 4, the distances 16 there are positioned between the two film layers 2, 4.

Figures 9, 10:
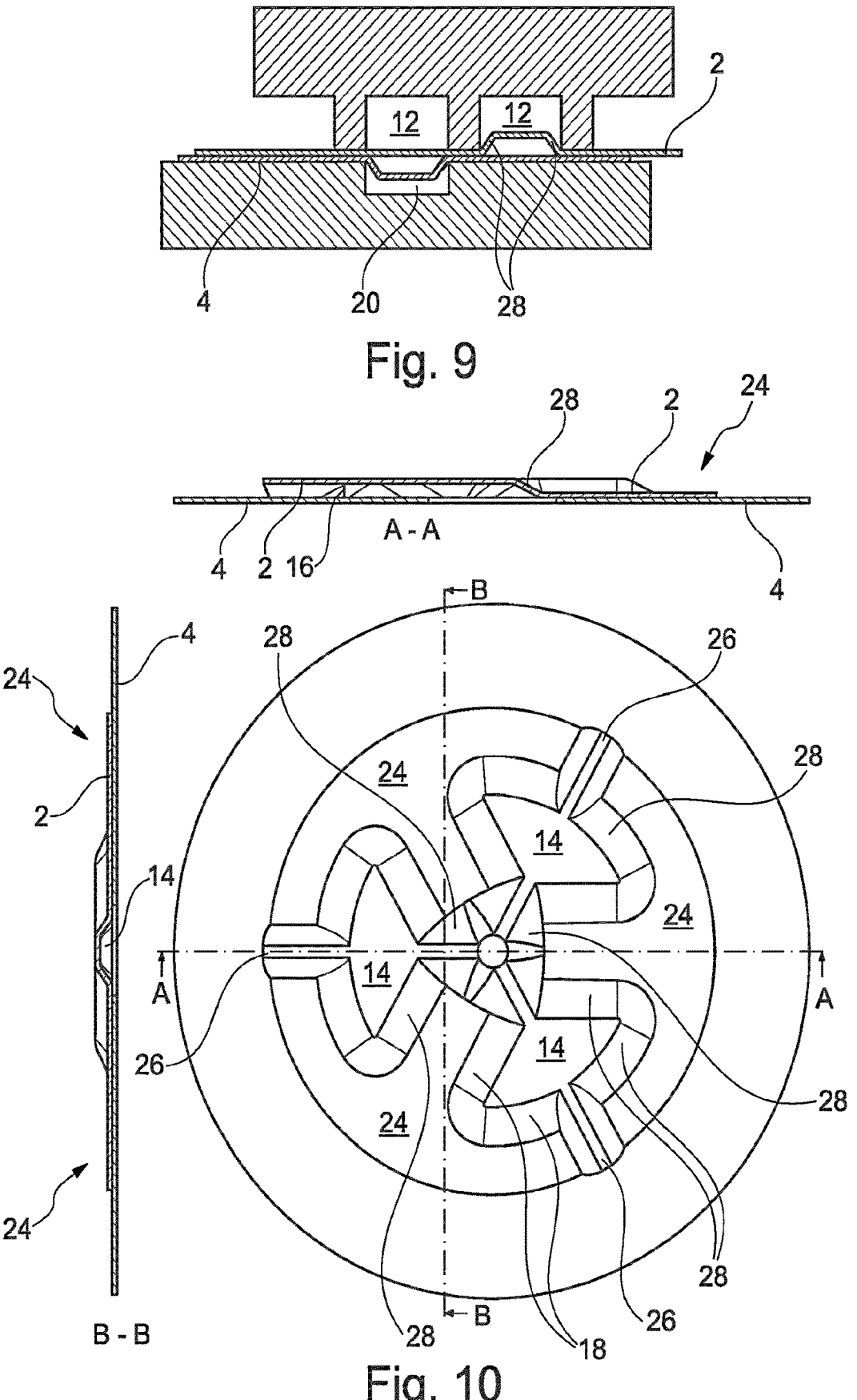

FIG. 9 depicts a situation that corresponds to the situation shown in FIG. 8, The intermediate film 22, however, not being arranged between the first film 2 and the second film 4.

FIG. 10 shows a top view of a part of two film layers 2, 4 that are joined together. Three parts 24 of a connection line 18 collectively form a ring that is interrupted at three points 26. Consequently, in the areas of the parts 24, the upper first film layer 2 is joined with the underlying second film layer 4. In the areas 28 that abut the parts 24, the first film layer 2 is not joined with the second film layer 4, but the distance between the two film layers 2, 4 is not constant. Rather, it increases the further one moves away from the parts 24. In FIGS. 2 to 9, the proportions 28 correspond to the areas of the first film layer 2 in which the distance between the first film layer 2 and the second film layer 4 or the intermediate film layer 22 increases. They are depicted in FIG. 9. Between them are the parts 14 of the first film layer 2, which are arranged at a distance 16 from the second film layer 4. The special embodiment ensures that the first film layer 2 does not lie against the second film layer 4 in the middle of the depicted interrupted ring made up of the three parts 24. In this area, the first film layer 2 preferably comprises an opening, depicted as a central circle, so that the fluid can enter the intermediate space between the two film layers 2, 4 from the volume.

The upper area of FIG. 10 shows the representation along the line of intersection AA. The first film layer 2 can be seen, which in the right-hand part is joined to the second film layer 4. This refers to the part 24. Adjacent to this is the area 28 in which the distance 16 between the first film layer 2 and the second film layer 4 increases. In the left-hand part of the sectional view, the first film layer 2 is already at the specified distance 16 from the second film layer 4, so that fluid can flow along here. The left-hand area of FIG. 10 shows the sectional view along the line of intersection B-B. In this area, the first film layer 2 is joined with the second film layer 4 via a further area. The part 14 in which the two film layers 2, 4 exhibit the distance only extends in the middle.

REFERENCE LIST 2 first film layer
4 second film layer
6 lower mold
8 upper mold
10 projection
12 intermediate space
14 part
16 distance
18 connection line
20 indentation
22 intermediate film layer
24 part
26 point
28 area

The invention claimed is:
1. A method for producing a cushion for an orthopedic device, the cushion having a first component comprising a first film layer and a second film layer, wherein the first film layer comprises at least one opening, wherein the first component is joinable to at least a second component such that there is at least one fluid-filled volume between the first component and the at least a second component, comprising:

inserting the first film layer and the second film layer into a tool which has an upper mold and a lower mold;

applying a differential pressure to at least one of the first film layer or the second film layer so that the first film layer or the second film layer to which the differential pressure is applied moves at least in sections towards the upper mold or the lower mold thereby creating a distance between the first film layer and the second film layer; and joining the first film layer and the second film layer along at least two connection lines that form at least one channel between the first film layer and the second film layer such that at least some fluid from the at least one fluid filled volume can enter a space between the first film layer and the second film layer through the at least one opening when pressure is applied to the at least one fluid filled volume, wherein the at least two connection lines are interrupted at least one point forming an outlet where the first film layer lies on the second film layer but where the first film layer is not joined to the second film layer at the at least one point, wherein under pressure at least some fluid in the space between the first film layer and the second film layer can pass between the first film layer and the second film layer at the at least one point.

2. The method according to claim 1, wherein when the differential pressure is applied, the first film layer and the second film layer are deformed and are then joined with each other along the at least two connection lines such that the first film layer and the second film layer do not lie against each other over an entire surface in an area of the at least opening of the first film layer.

3. The method according to claim 1 wherein the at least two connection lines are designed in a form of a ring that is interrupted at the at least one point.

4. The method according to claim 3, wherein the at least one opening of the first film layer lies at least partially within the ring.

5. The method according to claim 1, wherein the first film layer and the second film layer lie against each other over an entire surface along at least one section of the at least one channel.

6. The method according to claim 1 wherein the first film layer and the second film layer are joined by gluing or welding them together.

7. A cushion produced by a method according to claim 1.

8. The method of claim 3 wherein the ring is interrupted at at least three points.

9. The method of claim 6 further comprising heating at least one of the first film layer and the second film layer along the at least one connection line.

\* \* \* \* \*